(12) United States Patent
Kitagawara

(10) Patent No.: US 7,075,680 B2
(45) Date of Patent: Jul. 11, 2006

(54) IMAGE PROCESSING SYSTEM, IMAGE FORMING SYSTEM, AND RECORDING MEDIUM

(75) Inventor: Atsushi Kitagawara, Ebina (JP)

(73) Assignee: Fuji Xerox Co., Ltd., Tokyo (JP)

(*) Notice: Subject to any disclaimer, the term of this patent is extended or adjusted under 35 U.S.C. 154(b) by 987 days.

(21) Appl. No.: 09/971,681

(22) Filed: Oct. 9, 2001

(65) Prior Publication Data
US 2002/0122191 A1    Sep. 5, 2002

(30) Foreign Application Priority Data
Mar. 5, 2001    (JP)    ............... 2001-060179

(51) Int. Cl.
*H04N 1/40*    (2006.01)
(52) U.S. Cl. .................. 358/3.15; 358/2.1; 358/536
(58) Field of Classification Search ............... 358/1.9, 358/2.1, 3.06–3.09, 3.13–3.15, 3.2, 534–536
See application file for complete search history.

(56) References Cited

U.S. PATENT DOCUMENTS 6,473,202 B1 * 10/2002 Kanata et al. ............... 358/2.1
6,864,996 B1 *  3/2005 Fujita ......................... 358/3.13

FOREIGN PATENT DOCUMENTS

| JP | A 9-191403 | 7/1997 |
| JP | A 9-282471 | 10/1997 |
| JP | A 9-294208 | 11/1997 |
| JP | 2000069309 A | * 3/2000 |

* cited by examiner

*Primary Examiner*—Thomas D. Lee
*Assistant Examiner*—Stephen Brinich
(74) *Attorney, Agent, or Firm*—Oliff & Berridge, PLC

(57) ABSTRACT

A maximum color identifying portion 41 identifies a maximum color from coloring material colors used to reproduce a color of a line segment after color conversion into coloring material colors by a character/line color converting portion 31 is applied to the rasterized image signal. A structure deciding portion 42 outputs a screen parameter flag that controls a screen parameter in compliance with the identified maximum color and a drawing direction of the line segment such that the screen process in the maximum color is executed at a screen angle, that is different from the drawing direction of the line segment, in a character/line screen processing portion 35. The character/line screen processing portion 35 applies the screen process to the image in accordance with the screen parameter flag by using the screen parameter at the screen angle that is different from the drawing direction of the line segment. Accordingly, disappearance of the line segment due to the screen process is avoided.

27 Claims, 8 Drawing Sheets

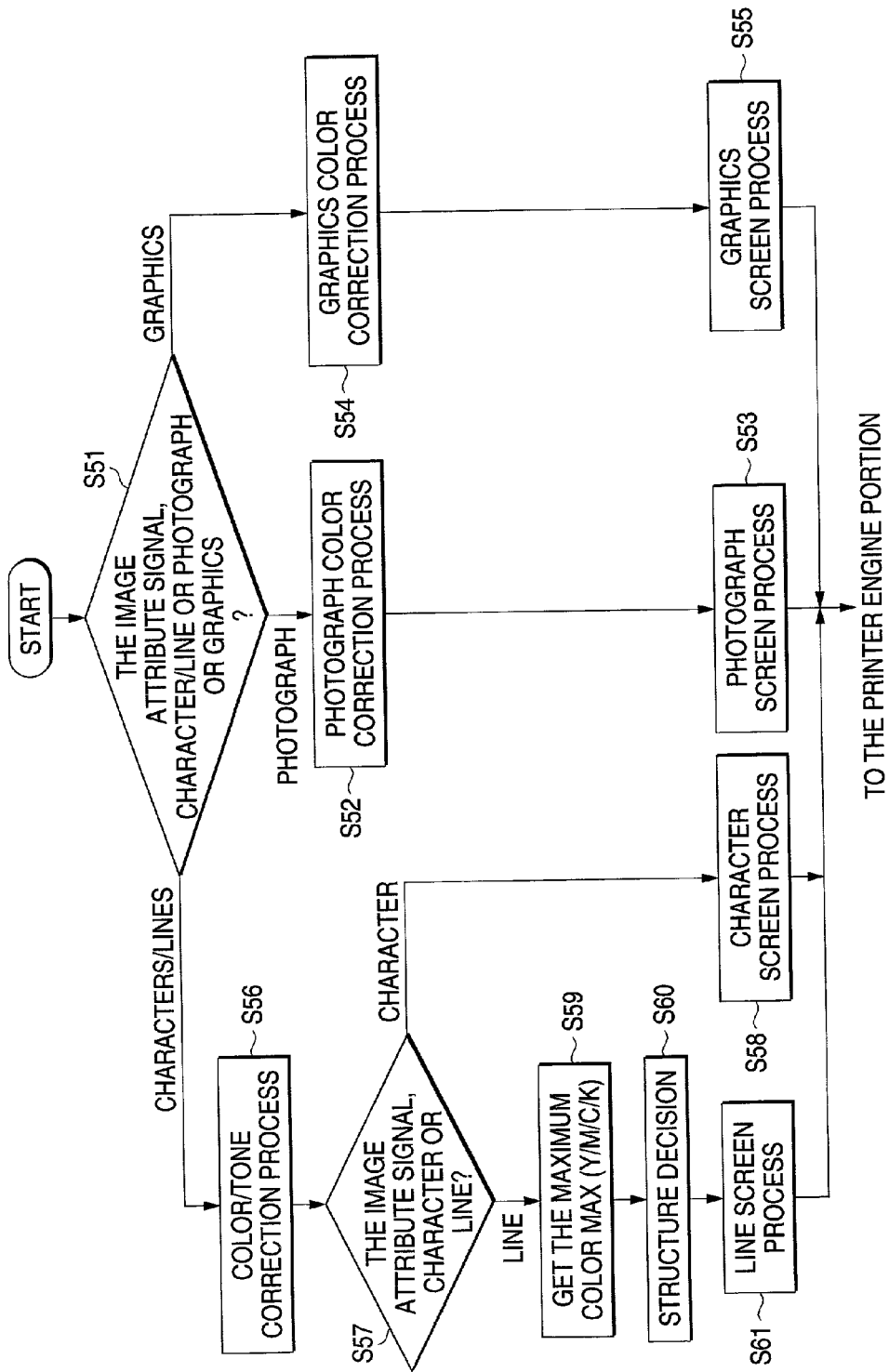

FIG. 7

| MAXIMUM COLOR | LINE DRAWING DIRECTION | SCREEN PARAMETER |
|---|---|---|
| K | RIGHT-UPWARD INCLINATION | NEGA |
| K | LEFT-UPWARD INCLINATION | POSI |
| M | RIGHT-UPWARD INCLINATION | NEGA |
| M | LEFT-UPWARD INCLINATION | POSI |
| C | RIGHT-UPWARD INCLINATION | NEGA |
| C | LEFT-UPWARD INCLINATION | POSI |
| Y | RIGHT-UPWARD INCLINATION | NEGA |
| Y | LEFT-UPWARD INCLINATION | POSI |

IMAGE PROCESSING SYSTEM, IMAGE FORMING SYSTEM, AND RECORDING MEDIUM

BACKGROUND OF THE INVENTION

1. Technical Field

The present invention relates to an image processing system and an image forming system for applying a screen process to an input image, and a recording medium for storing a program that causes a computer to execute such process.

2. Related Art

In the color image forming system, the color reproduction in full color can be achieved by using a plurality of coloring materials. The color image is formed by superposing the corresponding color image every coloring material. In superposing respective color images, slight displacement is caused due to the precision. The displacement in the superposition causes the generation of the moire, etc. on the image.

In order to prevent the generation of the moire, etc. due to the displacement in the superposition of respective color images, normally the rotation screen in which the screen angle to the image in the screen process is changed every coloring material color is employed. The screen angle in the rotation screen is designed not to generate the moire. At that time, there are the dot shape, the line shape, and the distributed shape as the screen shape. The dot shape can design the screen angle to have a margin of 90 degree, and the line shape can design the screen angle to have a margin of 180 degree. Normally, the line shape having the wide margin in design is employed.

In contrast, in the image of each coloring material color, normally the shade is expressed by the halftone-dot area system of the screen. This halftone-dot area system is the method that produces the shade in the overall image by changing the drawing area in the infinitesimal area of a predetermined size in response to the density tone to be drawn. For example, only one or several points in the infinitesimal area are drawn in the light portion, and thus the light tone can be expressed as the overall image since such points are scattered.

However, in the case of light color, a quite small part of the infinitesimal area can be drawn and thus areas that are drawn into predetermined patterns and areas that are not drawn into the predetermined patterns alternatively appear. Therefore, when a light thin line is to be drawn, the interference between the thin line and the drawing pattern occurs. In particular, in the light thin line having the angle that is close to the screen angle, there is the problem that the thin line is not drawn in many infinitesimal areas that successively appear in the extending direction of the thin line and that the light thin line disappears as the overall image. The disappearance of such line is ready to occur as the line is thinner, or the color is lighter, or the angle of the line is closer to the screen angle.

In the Unexamined Japanese Patent Application Publication No.Hei9-191403, for example, it is set forth that the line drawing is detected from the input image signal, and then the screen of the high resolution and the tone correction γ transformation are employed in the line drawing area. However, in this literature, much importance to the tone characteristic is attached in the portion except the line drawing portion, but much importance to the resolution is attached in the line drawing. Therefore, merely the screen shape, the screen line number, etc. are switched, but the disappearance of the thin line, etc. cannot be prevented. Like this literature, in order to prevent the disappearance of the light thin line by employing the screen of the high resolution, it is impossible to avoid such disappearance by 100% unless the resolution is increased up to the basic resolution. In such case, the color reproduction of the thin line is extremely lowered.

Also, in the Unexamined Japanese Patent Application Publication No.Hei9-282471, for example, it is set forth that features of respective pixels are acquired from the information described by PDL in the controller to execute the image processing every feature. In particular, the TEXT signal flag is provided to the object that needs the resolution for characters, line drawings, profiles, etc. to switch the image processing. However, in the screen process, merely the resolution is switched such that the 400-line screen process is applied to the image signal to which the TEXT signal flag is added and the 200-line screen process is applied to other signals. Thus, it is impossible to prevent the above-mentioned disappearance of the thin line only by switching the resolution.

In addition, in the Unexamined Japanese Patent Application Publication No.Hei9-294208, for example, it is set forth that the edges are detected from the image signal being input into the image processing system, and then a plurality of screen patterns having the same mask size are switched in response to the states of the edges. In particular, the tone reproduction can be stabilized by using the dot shapes in the portions except the edge portions, and also the edges can be made smooth by using the different screen shapes in the edge portions. As a result, the unevenness can be made smooth in the edge portions of the characters and the lines. However, in this case, such approach is not effective to the case where the thin line having the angle close to the screen angle disappears, and thus it is impossible to prevent the disappearance of the thin line.

SUMMARY OF THE INVENTION

Problems to Be Solved

The present invention has been made in view of the above circumstances, and it is an object of the present invention to provide an image processing system and an image forming system capable of preventing disappearance of a thin line and reproducing an image satisfactorily, and a recording medium for storing a program that causes a computer to execute such image process.

Means for Solving the Problems

The present invention provides:

an image processing system comprising:

a maximum color identifying portion for identifying a color, disappearance to be avoided, from a plurality of coloring material colors used to reproduce a color of a line segment constituting an input image as a maximum color;

a structure deciding portion for controlling a screen parameter in compliance with the maximum color identified by the maximum color identifying portion and a drawing direction of the line segment; and a screen processing portion for executing a screen process by using the screen parameter controlled by the structure deciding portion.

Further, the present invention provides:

an image forming system comprising:

a maximum color identifying portion for identifying a color, disappearance to be avoided, from a plurality of coloring material colors used to reproduce a color of a line segment constituting an input image as a maximum color;

a structure deciding portion for controlling a screen parameter in compliance with the maximum color identified by the maximum color identifying portion and a drawing direction of the line segment;

a screen processing portion for executing a screen process by using the screen parameter controlled by the structure deciding portion; and an image forming portion for forming an image which is subjected to the screen process by the screen processing portion on an image forming medium.

Still further, the present invention provides:

a computer-readable recording medium for storing a program that causes a computer to execute the steps of:

a maximum color identifying step of identifying a color, disappearance to be avoided, from a plurality of coloring material colors used to reproduce a color of a line segment constituting an input image as a maximum color, a structure deciding step of controlling a screen parameter so that a screen process in the maximum color is executed at a screen angle, and a screen processing step of executing the screen process by using the controlled screen parameter.

In the present invention, first the color whose disappearance should be avoided is identified from a plurality of coloring material colors used to reproduce the color of the line segment constituting the input image as the maximum color. Then, the screen parameter is controlled in compliance with the maximum color and the drawing direction of the line segment. At this time, the screen parameter is controlled such that the screen process in the maximum color is carried out at the screen angle that is different from the drawing direction of the line segment. Accordingly, if the screen process is executed by using the controlled screen parameter, the screen process can be carried out at the screen angle, that is different from the drawing direction of the line segment, at least in the maximum color. Therefore, the disappearance of the thin line, the thin-color line, etc. can be prevented.

Otherwise, the screen parameter is controlled such that the screen process in the maximum color can be carried out at the screen angle, that is different from the screen angle of the line in other drawing directions when the drawing direction of the line segment is a predetermined direction. Accordingly, as for the line segment having the drawing direction that easily disappears at the ordinary screen angle, for example, the screen process can be carried out at the screen angle, that is different from other line segments, at least in the maximum color. Therefore, the disappearance of the thin line, the thin-color line, etc. can be prevented.

As described above, the disappearance of the thin line is not so generated when the width of the line segment is thick or when the color is deep. Therefore, it is preferable that, if the line segment has a width smaller than a predetermined width or if the line segment has a density thinner than a predetermined density, the change of the screen angle should be executed when the drawing direction of the line segment is close to the screen angle that corresponds to the maximum color. Also, since the yellow is not so striking, other colors may be used preferentially rather than the yellow in identifying the maximum color to prevent the disappearance of other striking colors. In addition, the change of the screen angle can be easily constructed if any one of the screen angles that have mutual mirror image relationships should be selected. Further, if the selected screen angle is selected in the same resolution and line number, the extreme tone change and the degradation of the picture quality such as the density gap at the changed position, etc. can be prevented.

The change of the screen angle may be executed every line segment, for example. Otherwise, the screen angle may be set to the overall input image in total based on the decision result of each line segment.

BRIEF DESCRIPTION OF THE DRAWINGS

FIG. 6 is a flowchart showing an example of operations in a color/tone correction processing portion and a screen processing portion.

FIG. 7 is a view showing an example of a screen parameter setting method in a structure deciding portion.

DETAILED DESCRIPTION OF THE PREFERRED EMBODIMENTS

Embodiment of the Invention

Figure 1:
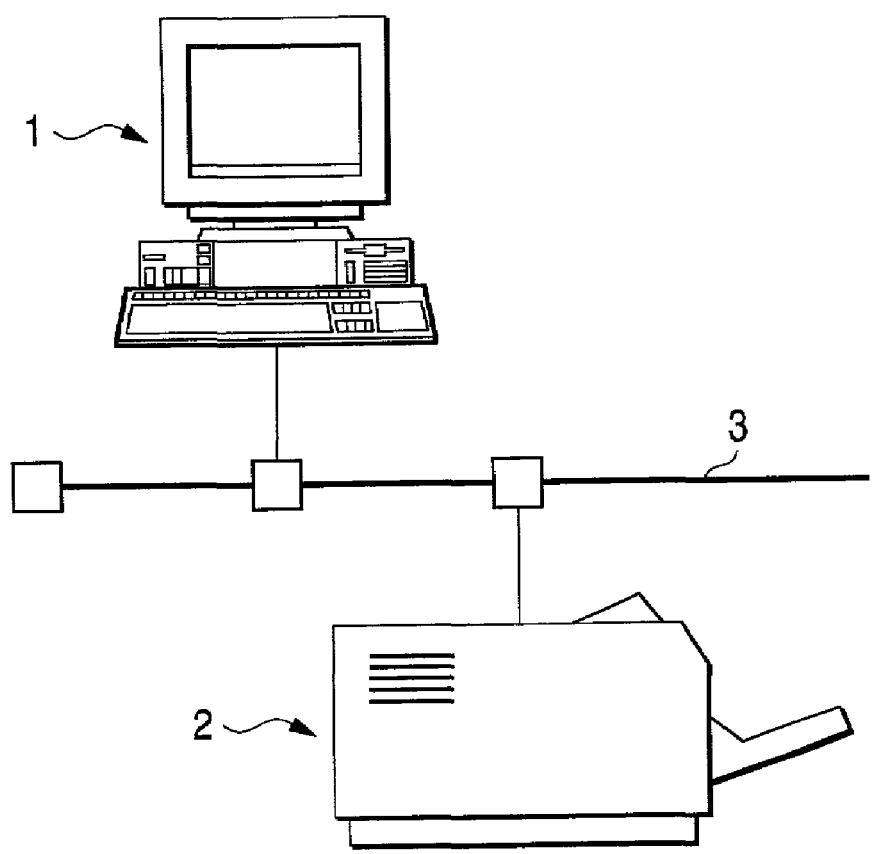
FIG. 1 is a schematic view showing an example of a configuration of image forming systems containing an embodiment of an image forming system of the present invention.
Figure 2:
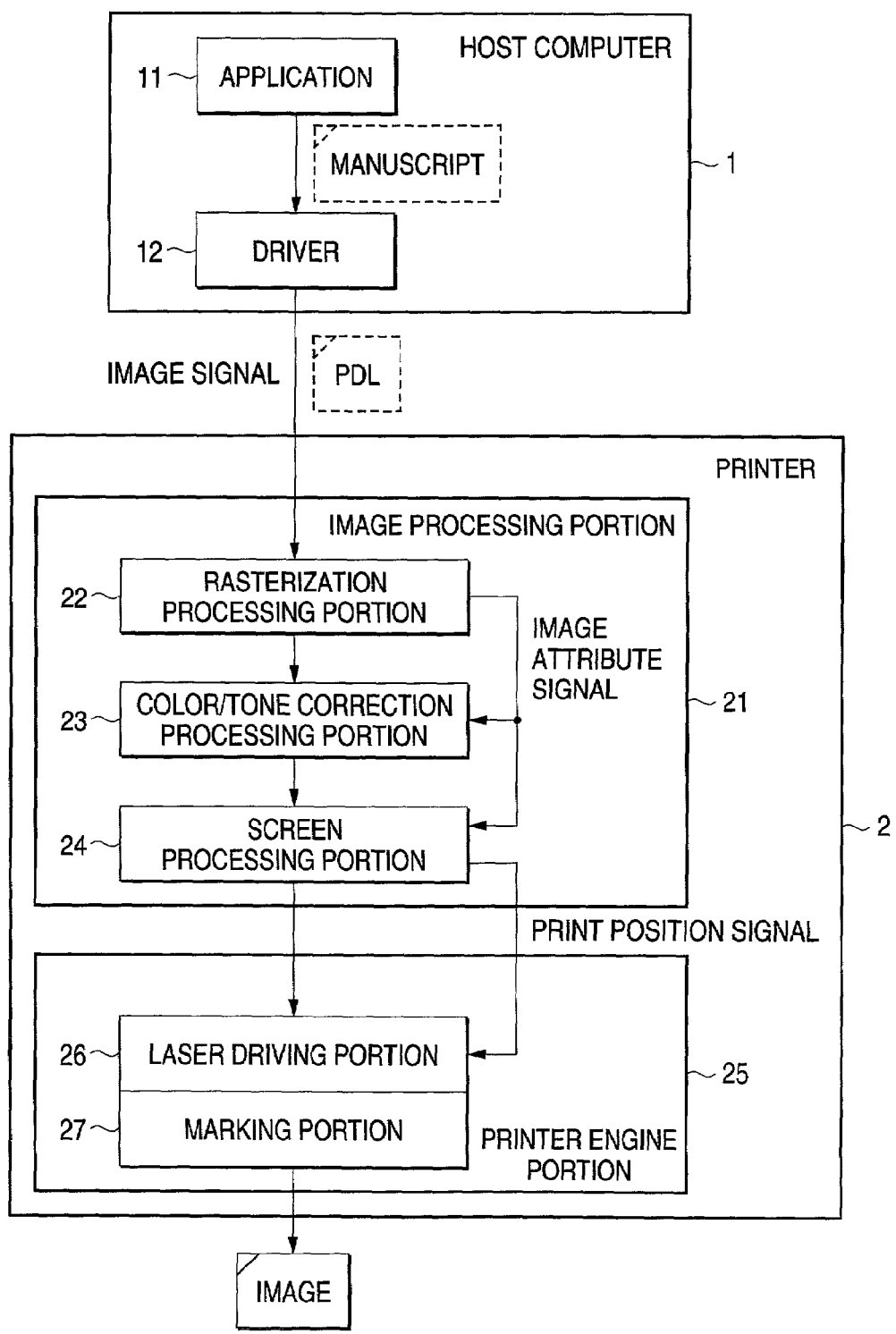
FIG. 2 is a block diagram showing an example of the image forming systems containing the embodiment of the image forming system of the present invention.

FIG. 1 is a schematic view showing an example of a configuration of image forming systems containing an embodiment of an image forming system of the present invention. FIG. 2 is a block diagram showing an example of the image forming systems containing the embodiment of the image forming system of the present invention. In FIG. 1 and FIG. 2, 1 is a host computer, 2 is a printer, 3 is a network, 11 is an application, 12 is a driver, 21 is an image processing portion, 22 is a rasterization processing portion, 23 is a color/tone correction processing portion, 24 is a screen processing portion, 25 is a printer engine portion, 26 is a laser driving portion, and 27 is a marking portion. In this example, the image forming system of the present invention shows an example containing the image processing system of the present invention.

The image forming system shown in FIG. 1 comprises the host computer 1 and the printer 2, and both are connected via the network 3. Also, there is the case where the to-be-formed image is sent from the device such as other computer via the network 3. In addition, the to-be-formed image may be sent via the communication line such as the telephone line (not shown), etc.

In this example, the application 11 for forming the document, the image, etc., and the driver 12 for converting the image to be formed in the printer 2 into the form interpretable for the printer 2 to transmit it to the printer 2 are provided to the host computer 1. When the formation of the image on the recording medium is requested, the manuscript formed by the application 11 is transmitted to the driver 12. The manuscript transmitted to the driver 12 is converted into the page description language (PDL), for example. The information of the actually formed image (object) as well as the object attribute information is added to the description given by the page description language.

The printer 2 has the image processing portion 21 and the printer engine portion 25. The image processing portion 21 interprets the page description language sent from the host computer 1, and then generates the image signal from which the best image can be formed in the printer engine portion 25 by applying various image processes. At this time, the best image processing is applied to the images having respective attributes in response to the image attribute signal being sent similarly from the host computer 1. The printer engine portion 25 forms actually the image on the recording medium.

It is of course that the data being sent from the host computer 1 to the printer 2 are not limited to the data described by PDL, etc., and the raster image stored in the file read by the image reading device, etc. may be employed. In the case of the raster image, the information indicating the attributes of respective drawings objects maybe supplied from the host computer 1, otherwise the attribute information may be generated by providing a raster image analyzing portion to the printer 2 in place of the rasterization processing portion 22 described later. In the following explanation, it is assumed that the data being sent from the host computer 1 to the printer 2 is PDL as an example.

The data sent to the printer 2 and described by PDL is interpreted in the rasterization processing portion 22 and the raster image is formed. At this time, for respective objects, the attribute signals containing the information such as the type, e.g., characters/lines, the photograph, the graphics, the drawing direction of the line, and others, for example, are generated and then output to the color/tone correction processing portion 23, the screen processing portion 24, etc.

In the color/tone correction processing portion 23, various correcting processes such as the color conversion from the RGB color space to the YMCK color space, the tone correcting process, etc. are carried out by employing the color correction coefficients, that are most suitable for respective attributes, in compliance with the attribute signals being sent from the rasterization processing portion 22. The RGB color space is the color space of PDL being input from the application 11, and the YMCK color space is the color space that is constructed by the color of the coloring material (referred to as a "coloring material color" hereinafter) employed in the printer engine portion 25. In the color/tone correction processing portion 23, the decision of the screen angle, described later, the designation of the screen angle to the subsequent screen processing portion 24, etc. of the line segments are executed particularly, so that the disappearance of the thin line, the light-color line, etc. is prevented.

After the process executed in the color/tone correction processing portion 23, the screen process is executed in the screen processing portion 24 to meet to the characteristic of the printer engine portion 25. According to this screen process, the halftone-dot images that are processed by the area-tone modulating system every coloring material color are formed. In this screen processing portion 24, the screen process is also carried out by employing the screen coefficient, that is most suitable for each attribute, in accordance with the attribute signal that is sent from the rasterization processing portion 22.

The halftone-dot images are sent out to the printer engine portion 25. In case the printer engine portion 25 is the laser electrophotographic system, such portion 25 is constructed by the laser driving portion 26 and the marking portion 27 that contains respective charging/developing/transferring/fixing portions, and others. The laser driving portion 26 controls the laser beam, and the marking portion 27 forms the latent image and then develops it to form the image on the recording medium.

Figure 3:
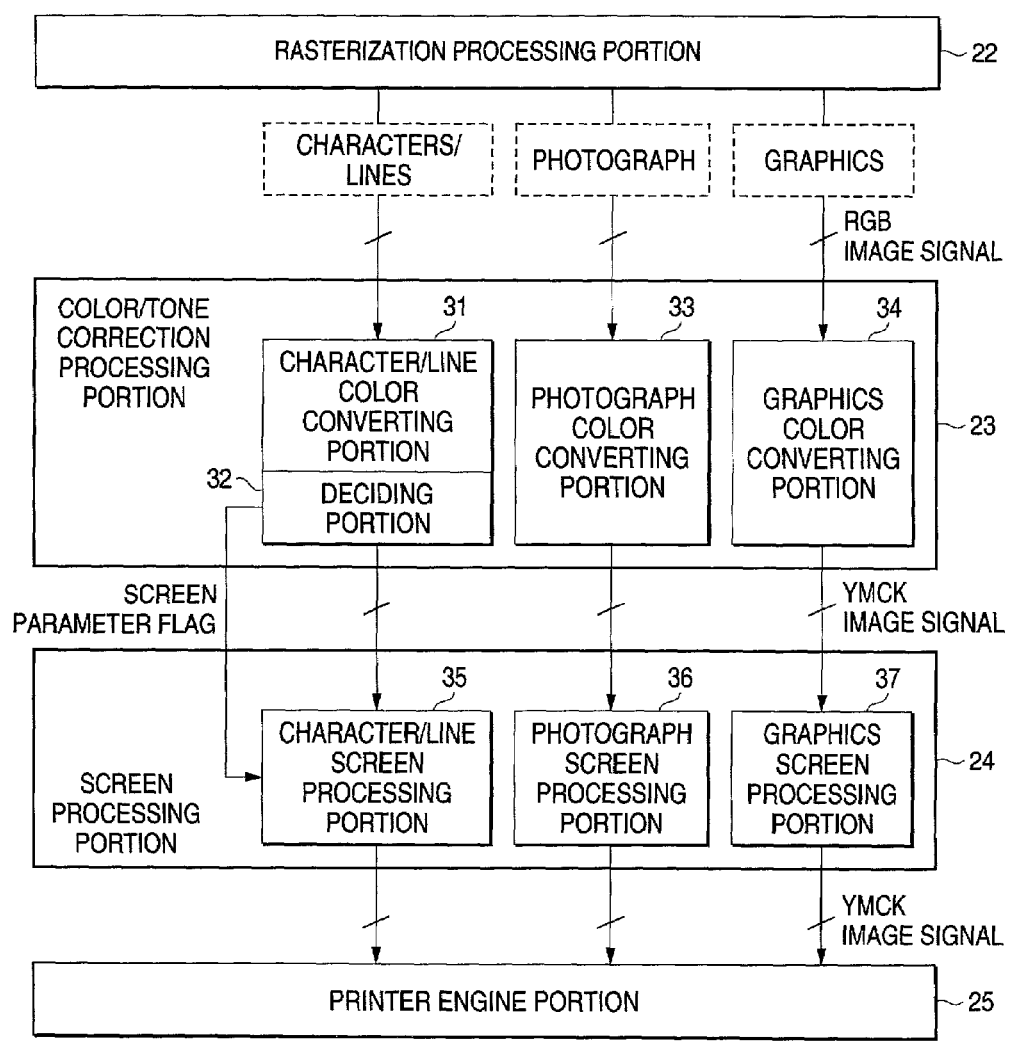
FIG. 3 is a block diagram showing an example of an image processing portion.

FIG. 3 is a block diagram showing an example of the image processing portion. In FIG. 3, 31 is a character/line color converting portion, 32 is a deciding portion, 33 is a photograph color converting portion, 34 is a graphics color converting portion, 35 is a character/line screen processing portion, 36 is a photograph screen processing portion, and 37 is a graphics screen processing portion. The image processing portion 21, when receives the page description language, executes the process every attribute of each object. The rasterization processing portion 22 rasterizes respective objects and then transfers the attribute information to the color/tone correction processing portion 23 as the image attribute signal. For purposes of simplification of the explanation, FIG. 3 shows process flows that are divided into respective attributes. Also, three types of the character/line, the photograph, and the graphics are shown as the attributes. Of course, other attributes may be employed if they can discriminate at least the line attribute.

If the attribute is the photograph, the color converting process that is most suitable for the photograph is carried out in the photograph color converting portion 33, then the screen process that is most suitable for the photograph is carried out in the photograph screen processing portion 36, and then the photograph is transferred to the printer engine portion 25. Similarly, if the attribute is the graphics, the color converting process that is most suitable for the graphics is carried out in the graphics color converting portion 34, then the screen process that is most suitable for the graphics is carried out in the graphics screen processing portion 37, and then the graphics is transferred to the printer engine portion 25.

The case where the attribute is the character/line is similar, and the color converting process that is most suitable for the character/line is carried out in the character/line color converting portion 31. Then, in the deciding portion 32, the drawing direction of the line segment and the maximum color of the coloring material color used to draw the line segment are decided and also the screen parameter of the screen processing portion 24 to the character/line screen processing portion 35 is controlled based on the screen angle and the drawing direction. At this time, the screen parameter is controlled such that the screen angle at the maximum color is different from the drawing direction of the line segment. Then, the screen process is carried out in the character/line screen processing portion 35 in compliance with the screen parameter controlled in the deciding portion 32, and then the character/line is transferred to the printer engine portion 25.

In FIG. 3, for convenience, the character/line screen processing portion 35, the photograph screen processing portion 36, and the graphics screen processing portion 37 are provided in the screen processing portion 24. But these may be implemented by the same screen processing portion after the screen parameter is changed. Also, this is similarly true of the character/line color converting portion 31, the photograph color converting portion 33, and the graphics color converting portion 34. The same color converting configuration may be commonly employed by changing the conversion coefficient in response to the attribute, etc.

Figure 4:
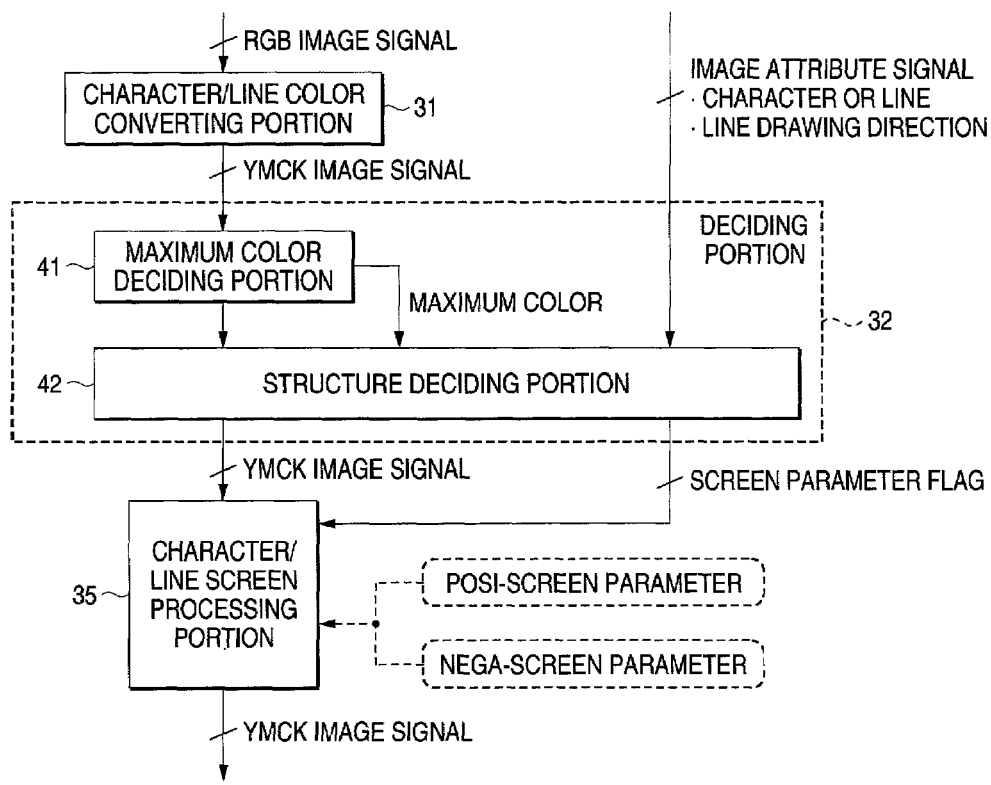
FIG. 4 is a block diagram showing an example of processes applied to a line segment in the image processing portion.

FIG. 4 is a block diagram showing an example of processes applied to a line segment in the image processing portion. In FIG. 4, 41 is a maximum color deciding portion, and 42 is a structure deciding portion. The raster image of the object whose attribute developed in the rasterization processing portion 22 is the characters/line is input into the character/line color converting portion 31 of the color/tone correction processing portion 23 as the image signal for the RGB color space, for example. Then, in the character/line color converting portion 31, the correction process that is suitable for the character/line, etc. are applied to the image signal, and then this image signal is converted into the image signal of the color space such as the YMCK color space, for example, constructed by the coloring material color employed in the printer engine portion 25. The converted image signal of the YMCK color space, for example, is input into the maximum color deciding portion 41 in the deciding portion 32.

In the maximum color deciding portion 41, the color to avoid the disappearance in the screen process is identified as the maximum color from respective coloring material colors used to reproduce especially the color of the line segment. It is possible to generate the interference between the screen and the line segment in any coloring material color, but such advantage can be achieved by avoiding the disappearance of the loudest color. In case the coloring material colors are four colors of Y, M, C, K, for example, the color with largest value (any one of YMCK) out of the Y, M, C, K values of the line segments may be selected as the maximum color. For example, if the blue line segment has (Y, M, C, K)=(0, 30, 20, 0), the M (Magenta) color is identified as the maximum color. In identifying the maximum color, it is preferable that other colors should be preferential to the Y (yellow) color. Since the Y color is hard to be striking even if it has the large value, sometimes more desirable results can be obtained by avoiding the disappearance of other colors.

The structure deciding portion 42 receives the image signal of the YMCK color space output from the character/line color converting portion 31 via the maximum color deciding portion 41, and receives the information of the maximum color identified similarly by the maximum color deciding portion 41, and also receives the attribute signal being output from the rasterization processing portion 22. Then, the structure deciding portion 42 confirms the character/line attribute based on the received attribute signal, and also identifies the drawing direction of the line segment. Here, if the attribute is the line, the screen parameter is controlled according to the drawing direction of the line segment and the maximum color received from the maximum color deciding portion 41 such that the screen process of the maximum color can be executed at the screen angle that is different from the drawing direction of the line segment in the screen processing portion 24. Otherwise, when the drawing direction of the line segment is a predetermined direction such as the direction in which the line segment is easily disappeared, for example, the screen parameter is controlled such that the screen process of the maximum color can be executed at the screen angle that is different from the screen angle to the line segment in other drawing directions.

As described above, if the screen angle and the drawing direction of the line segment are close to each other, the possibility that the line segment disappears in the screen process is increased. If particularly the maximum color disappears, there is caused the drawback that the line segment itself disappears, or the image is drawn only by other colors and reproduced by the totally different color. Accordingly, the screen parameter is controlled in response to the maximum color and the drawing direction of the line segment such that the screen angle in the maximum color can be differentiated from the drawing direction of the line segment in the screen process performed in the character/line screen processing portion 35. Otherwise, if the line segment is drawn in the direction in which it is easily disappeared, the screen parameter is controlled such that the screen process of the maximum color can be executed at the screen angle that is different from the screen angle for the line segment in other drawing direction in the screen process performed in the character/line screen processing portion 35. In order to control the screen parameter, the structure deciding portion 42 outputs the screen parameter flag to the character/line screen processing portion 35. If the attribute is the character, such effect is informed the character/line screen processing portion 35 by using the screen parameter flag to executed the screen process of the character without such decision. Especially, if the character/line screen processing portion 35 employs the rotation screen, the screen angles are different according to respective coloring material colors. Therefore, the screen parameter is controlled in the maximum color received from the maximum color deciding portion 41 such that the screen angle is differentiated from the drawing direction of the line segment.

As described above, as the case where the possibility of the disappearance of the image by the screen process is high, there are the case where the line segment is thin, the case where the color is light, etc. Therefore, the line segment whose width is smaller than a predetermined width and which is received from the attribute signal, for example, can be set as the controlled object of the screen parameter in which the above screen angle is changed, as described above. Also, the line segment whose density is lighter than a predetermined density, for example, can be set as the controlled object of the screen parameter in which the above screen angle is changed, as described above. It is a matter of course that these conditions can be combined together.

The character/line screen processing portion 35 receives the image signal via the structure deciding portion 42 and also receives the screen parameter flag being sent from the structure deciding portion 42. Then, the character/line screen processing portion 35 selects any one of the screen parameters having different screen angles according to the control by the screen parameter flag, and then applies the screen process to the image signal to output the resultant signal. In FIG. 4, two type parameters, i.e., the posi-screen parameter and the nega-screen parameter are shown as the screen parameter to be selected, and any one should be selected. It is of course that three type screen parameters or more may be present to be selected.

Figure 5A:
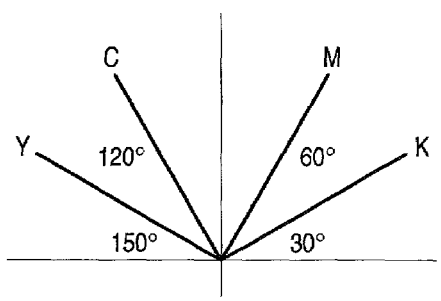
FIGS. 5A–5B are views showing an example of screen parameters.
Figure 5B:
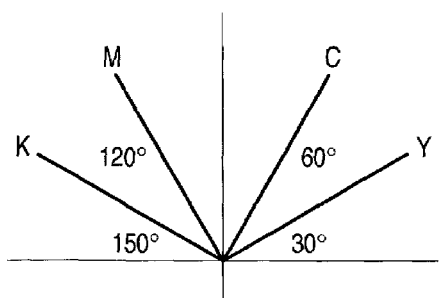

FIGS. 5A and 5B are views showing an example of screen parameters respectively. In order to differentiate the screen angles, for example, the parameters having the screen angles that have the mutual mirror image relationship may be set. In FIGS. 5A and 5B, the screen angles for two different screen parameters are illustrated by a thick line respectively. In the example of the screen parameters shown in FIG. 5A, the Y, M, C, K screen angles are set to 150°, 120°, 60°, 30° respectively. Also, in the example of the screen parameters shown in FIG. 5B, the screen angles that have the mirror image relationship with the screen angles shown in FIG. 5A are set. That is, the screen parameters are set such that the Y, M, C, K screen angles are set to 30°, 60°, 120°, 150° respectively.

If the line segment to be drawn in the direction that is close to the screen angle in one screen parameter is present by employing such screen parameter to switch, the drawing direction of the line segment and the screen angle can be differentiated with each other by employing the other screen parameter. Also, the screen parameters whose screen angles have the mirror image relationships mutually can be set easily.

Here, the screen parameter having the screen angle shown in FIG. 5A is called the posi-screen parameter, and the screen parameter having the screen angle shown in FIG. 5B is called the nega-screen parameter and shown in FIG. 4. The screen angles of respective colors shown in FIGS. 5A and 5B are one example and may be set arbitrarily. Of course, the screen parameter is not limited to the screen parameter whose screen angle has the mutual mirror image relationship, as shown in FIGS. 5A and 5B. Any sets of screen parameters whose screen angles are different may be prepared to be selected.

Preferably, the above screen parameters, that can be selected to execute the screen process of the line segment in the character/line screen processing portion 35, have the different screen angles in the same resolution and the same number of lines. Accordingly, the large density change, etc. are not generated and thus the degradation of the picture quality can be prevented.

In the above example, the structure deciding portion 42 controls the screen parameter, that is employed in the character/line screen processing portion 35, by using the screen parameter flag. But the control of the screen parameter is not limited to this. The screen parameter itself, that is employed in the character/line screen processing portion 35 may be transferred from the structure deciding portion 42 to control the screen parameter.

FIG. 6 is a flowchart showing an example of operations in the color/tone correction processing portion and the screen processing portion. First, in S51, the color/tone correction processing portion 23 decides the attribute signal output from the rasterization processing portion 22. Here, assume that there are four types of the character, the line, the photograph, and the graphics as the attribute signal output from the rasterization processing portion 22. If the attribute signal is the photograph, the photograph color conversion and color correction processes are executed in the photograph color converting portion 33 in S52 and also the photograph screen process is executed in the screen processing portion 24 by using the photograph screen parameter in S53. Similarly, if the attribute signal is the graphics, the graphics color conversion and color correction processes are executed in the graphics color converting portion 34 in S54 and the graphics screen process is executed in the screen processing portion 24 by using the graphics screen parameter in S55.

If the attribute signal is the character and the line, the characters/line color conversion and color correction processes are executed in the character/line color converting portion 31 in S56 and also it is decided in S57 that the attribute is the character or the line. Then, if the attribute is the character, the character screen process is executed in the screen processing portion 24 by using the graphics screen parameter in S58.

If the attribute is the line, the maximum color deciding portion 41 acquires the color having the maximum value (maximum color) from the coloring material colors constituting the color of the line segment in S59. For example, if the coloring material colors are Y, M, C, K, any color of them is selected. At this time, other colors can be set preferentially as the maximum color rather than the Y color that has the large value but is not so striking. For example, if only the Y component is contained, Y can be selected as the maximum color. If other color components of more than secondary colors are contained in excess of a predetermined amount, the maximum color can be selected from other colors although Y has the maximum value.

Then, in S60, the structure deciding portion 42 decides based on the maximum color acquired in S59 and the drawing direction of the line segment whether or not the screen angle should be changed, and then sets the screen parameter flag to execute the screen process by using the proper screen angle. Then, in S61, the screen processing portion 24 selects the screen parameter by using the screen parameter flag being set in S60 and executes the line screen process.

FIG. 7 is a view showing an example of a screen parameter setting method in the structure deciding portion. In the example shown in FIG. 7, there is shown a setting method employed when the screen angle is set based on the maximum color acquired in the maximum color deciding portion 41 and the drawing direction of the line segment. The "posi" in the screen parameter column indicates the case where the posi-screen parameter shown in FIG. 5A is selected, and the "nega" indicates the case where the nega-screen parameter shown in FIG. 5B is selected. For example, in the case that the M color is acquired as the maximum color in the maximum color deciding portion 41, when the drawing direction of the line segment has the right-upward inclination, the screen angle and the drawing direction become close if the posi-screen parameter shown in FIG. 5A is employed. As a result, the case where the M color component of the line segment disappears may be considered. Since the M color is the maximum color, the line segment disappears almost completely or the significant color difference occurs when the disappearance of the M color component is caused. In order to prevent this event, the nega-screen parameter is selected. Accordingly, since the M color screen angle is 120° and has the right-downward inclination shown in FIG. 5B, the disappearance of the line segment is never caused even if the screen process is executed by the screen processing portion 24, and thus the line segment can be reproduced satisfactorily. Conversely, in the case that the drawing direction of the line segment has the left-upward inclination, if the nega-screen parameter shown in FIG. 5B is selected, the screen angle and the drawing direction become close and therefore the posi-screen parameter shown in FIG. 5A is employed to prevent the disappearance of the line segment in the maximum color. The same is true of other maximum colors.

In this manner, the screen parameter can be set based on the maximum color and the drawing direction of the line segment not to cause the disappearance of the line segment. Accordingly, the disappearance of the line segment due to the interference between the line segment to be drawn and the screen process can be avoided. Also, if the screen having the same number of screen lines is employed alternatively at this time, the good tone reproduction can be achieved not to generate the sudden change in the tone reproduction and the gap at the switching position. In addition, since the switching of various processes such as the color conversion, the gamma correction process, etc. in the color/tone correction processing portion 23 is not needed, the cost can be reduced and also the reduction in performance can be suppressed. There is the case where the screen angle and the drawing direction of the line segment become close in the colors except the maximum color, but such influence is smaller than the disappearance of the maximum color.

The selection of the screen parameter as shown in FIG. 7 is not required for all line segments. For example, if any one shown in FIGS. 5A and 5B is selected previously, the selection shown in FIG. 7 can be carried out when the width of the line segment is less than a predetermined width or when the color of the line segment is less than a predetermined density. For example, the line segment whose width is less than 0.25 point can be selected as the selection object of the screen parameter.

Also, as the screen parameters to be selected, the screen parameter by which the screen process using the screen angle, that is rotated to the angle other than the angle at which the line segment disappears, is executed may be prepared in addition to the mirror image relationship shown in FIG. 5. For example, the screen angle that is rotated by 90 degree or 270 degree may be employed. The screen shape is selected arbitrarily. Thus, in addition to the line screen whose screen angle can be easily controlled, various screen shapes such as the dot screen may be applied.

Figure 8:
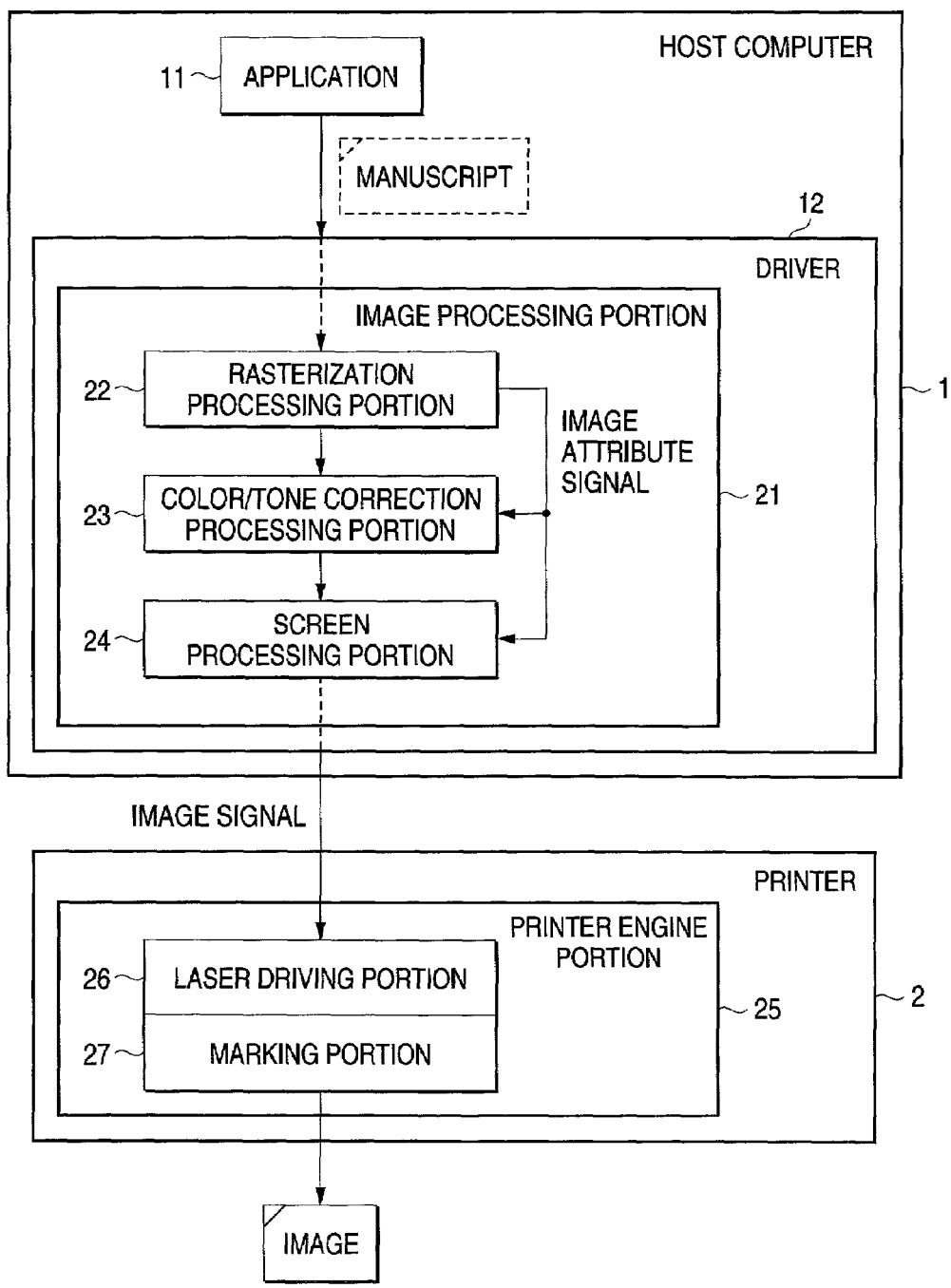
FIG. 8 is a block diagram showing an example of a host computer containing an embodiment of the image processing system of the present invention.

FIG. 8 is a block diagram showing an example of the host computer containing the embodiment of the image processing system of the present invention. The symbols in FIG. 8 are similar to those in FIG. 1 and FIG. 2, and their redundant explanation will be omitted hereunder. This example shows the example where the image processing system of the present invention is incorporated into the driver 12 of the host computer 1.

The manuscript prepared by the application 11 is transferred to the driver 12 when the formation of the image onto the recording medium is requested. After the manuscript is transferred to the driver 12, the driver 12 executes various processes to form the image by the printer 2. As a part of the processes, the rasterization process in the rasterization processing portion 22, the color conversion process and the tone correction process in the color/tone correction processing portion 23, the screen process in the screen processing portion 24, etc. are carried out in the image processing portion 21. In such processes, as mentioned above, the maximum color of the line segment is acquired, the screen parameter is controlled based on the maximum color and the drawing direction of the line segment, and the screen process is executed at the screen angle that is different from the drawing direction of the line segment in the screen processing portion 24. The image that is subjected to the screen process in this manner is transferred to the printer 2.

In the case of this configuration, the raster data is transferred from the host computer 1 to the printer 2. It is of course that, as shown in FIG. 1, the raster data may be transferred from the host computer 1 to the printer 2 via the network 3. For example, this is particularly effective to the configuration in which the host computer 1 and the printer 2 are directly coupled via the cable by using various parallel interfaces or serial interfaces.

The overall image processing portion 21 is provided on the printer 2 side in FIG. 2, and the image processing portion 21 is provided in the driver 12 of host computer 1 in FIG. 8. The present invention is not limited to these examples. For example, a part of the image processing portion 21 may be provided in the driver 12 of host computer 1 and the remaining may be provided in the printer 2. For example, the screen processing portion 24 may be provided in the printer 2, and the rasterization processing portion 22 and the color/tone correction processing portion 23 may be provided in the driver 12. In this case, the screen parameter flag, the attribute signal of the image, etc. may be transferred from the host computer 1 to the printer 2.

In addition, the image processing portion 21 may be provided in the server, or the like provided on the network 3, then the host computer 1 may request the server to execute the image process, and then the server may transfer the image to the printer 2 after it has executed the above image process. Of course, the Internet as well as LAN, etc. may be employed as the network 3.

In the above examples, the unit used in switching the screen parameter by the screen parameter flag is not particularly mentioned. For example, the unit maybe switched every object. However, in the low-cost printer, the increase of the processing load is brought about or the tone reproducing ability is influenced if the switching of the screen parameter is executed every object. For this reason, the switching of the screen parameter may be executed in a predetermined unit such as one job unit, one page unit, or the like. In this case, the case where a plurality of line objects exist in the unit is supposed. In such case, the statistics may be calculated based on the drawing direction of the line segment and the maximum color, and then the screen parameter flag may be set based on the statistical value. At this time, the employed screen parameter may be controlled while considering various elements such that the weighting is applied in response to the conspicuous feature such as the length of the line segment, the density, etc. or the weighting is applied in response to the possibility of the disappearance.

Figure 9:
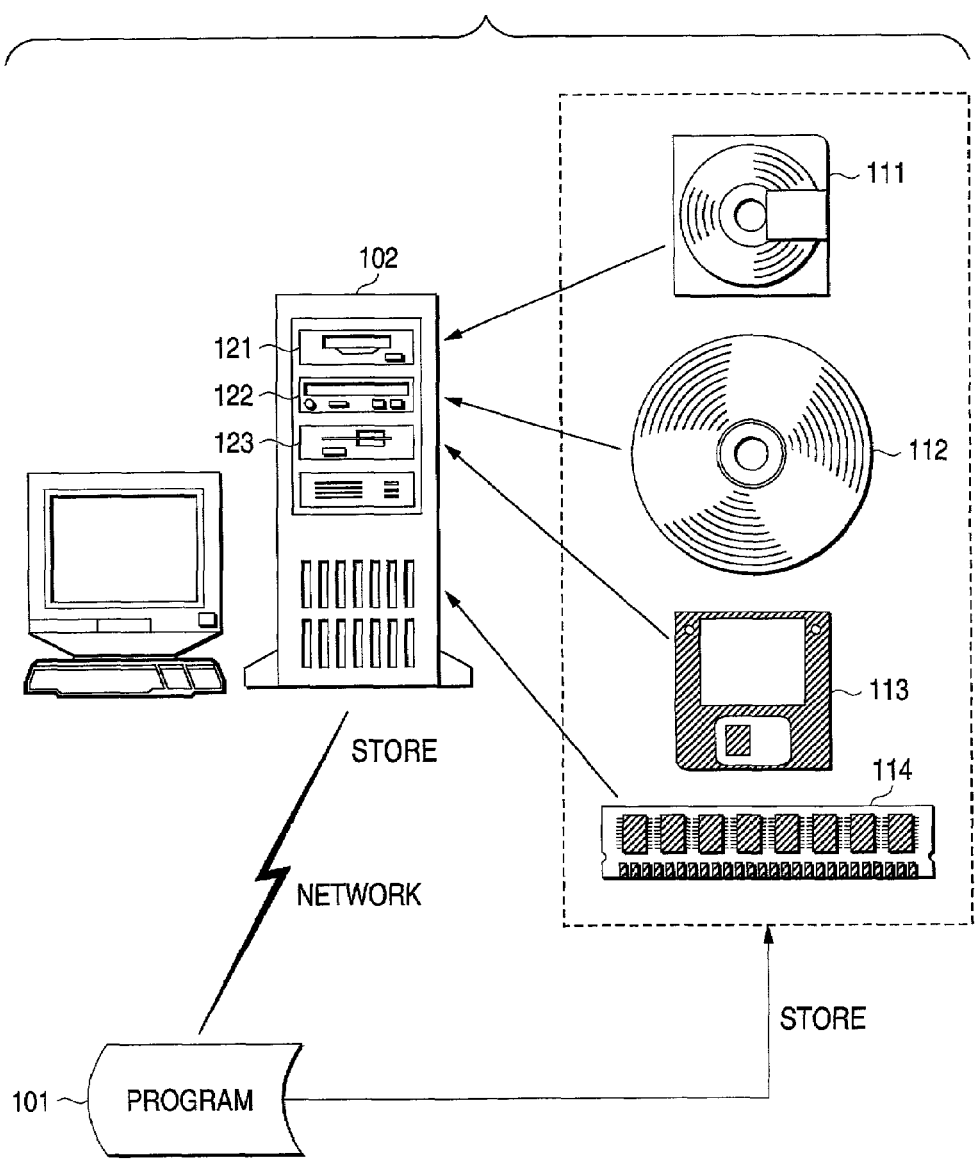
FIG. 9 is a view showing an example of a recording medium for storing a computer program when the process to be processed in the image processing system of the present invention is executed by the computer program.

FIG. 9 is a view showing an example of a recording medium for storing a computer program when the process to be processed in the image processing system of the present invention is executed by the computer program. In FIG. 9, 101 is a program, 102 is a computer, 111 is a magneto-optical disk, 112 is an optical disk, 113 is a magnetic disk, 114 is a memory, 121 is a magneto-optical disk drive, 122 is an optical disk drive, and 123 is a magnetic disk drive.

In the above examples, the processes executed at least in the image processing portion 21 can be accomplished by the program 101 that is carried out by the computer. In such case, the program 101 and the data used in the program can be stored in the computer-readable storing medium. The storing medium may cause change of the energy such as magnetism, light, electricity, or the like in the reading device provided to the hardware resources of the computer in response to the described contents of the program, and then may transmit the described contents of the program to the reading device in the form of the corresponding signal. For example, there are the magneto-optical disk 111, the optical disk 112, the magnetic disk 113, the memory 114, etc. Of course, these storing media are not limited to the portable type.

If the program 101 is stored in the storing medium and then this storing medium is loaded on the magneto-optical disk drive 121, the optical disk drive 122, or the magnetic disk drive 123 of the computer 102 or is inserted into the memory slot (not shown), the above processes in the image processing portion 21 can be carried out by reading the program 101 from the computer. Otherwise, the storing medium is loaded previously on the computer 102, then the program 101 is transferred to the computer 102 via the communication path such as the network (containing the LAN, the Internet, etc.), and then the program 101 is stored in the storing medium to execute. Of course, as described above, if the functions of the image processing system are separated into the host computer 1 and the printer 2, the programs may be stored in separate storing media so as to correspond to the processes executed in respective apparatuses, and then the separate storing media are loaded on respective apparatuses to execute the processes as a whole.

Advantages of the Invention

As apparent from the above explanation, according to the present invention, the screen process is executed by controlling the screen parameter such that the screen process can be carried out at the screen angle, that is different from the drawing direction of the line segment, in the maximum color of the coloring material colors constituting the line segment. Otherwise, the screen process is executed by controlling the screen parameter such that the screen process in the maximum color can be carried out at the screen angle, that is different from the screen angle for the line segment in other drawing directions, when the drawing direction of the line segment is set to the predetermined direction. Accordingly, it is possible to avoid the disappearance of the line segment, especially the thin line or the light-color line, due to the interference between the drawing direction of the line segment and the screen angle. In addition to this, the significant color difference can be prevented by avoiding the disappearance of the line segment in the maximum color. Also, even if any screen angle is employed, the tone reproducing performance can be made uniform by using the same screen line number, and thus the generation of the abrupt density gap, etc. can be suppressed. In addition, since the screen parameter is changed to prevent the disappearance of the line segment, there is no necessity to switch the color/tone correction parameter, etc. and also it is not needed to hold the parameters such as enormous color conversions, UCR, etc. in a number of memories. Also, the memory cost can be lowered, and the good reproduction of the picture quality can be achieved without the large scale object separation and the color correction/screen processes.

What is claimed is:

1. An image processing system comprising:
   a maximum color identifying portion for identifying a color, disappearance to be avoided, from a plurality of coloring material colors used to reproduce a color of a line segment constituting an input image as a maximum color;
   a structure deciding portion for controlling a screen parameter in compliance with the maximum color identified by said maximum color identifying portion and a drawing direction of the line segment; and
   a screen processing portion for executing a screen process by using the screen parameter controlled by said structure deciding portion;
   wherein:
   said structure deciding portion controls the screen parameter so that the screen process in the maximum color is earned out at a screen angle, that is different from the drawing direction of the line segment, in said screen processing portion.

2. The image processing system according to claim 1, wherein
   said structure deciding portion controls the screen parameter so that the screen process in the maximum color is carried out at a screen angle, that is different from the screen angle with respect to a line in other drawing directions when the drawing direction of the line segment is a predetermined direction.

3. The image processing system according to claim 1, wherein
   said structure deciding portion decides whether or not the line segment is thinner than a predetermined width upon controlling the screen parameter.

4. The image processing system according to claim 1, wherein
   said structure deciding portion decides whether or not a density of the line segment is thinner than a predetermined density upon controlling the screen parameter.

5. The image processing system according to claim 1, wherein
   said maximum color identifying portion uses preferentially other colors rather than a yellow upon identifying the maximum color.

6. The image processing system according to claim 1, wherein
   said screen processing portion is constructed so that the screen process at a plurality of screen angles in same resolutions and line numbers is capable to be selected by controlling the screen parameter.

7. The image processing system according to claim 1, wherein
   said screen processing portion is constructed so that any of screen angles having mutual mirror image relationships is capable to be selected by controlling the screen parameter.

8. The image processing system according to claim 1, wherein
   said structure deciding portion controls the screen parameter every line segment.

9. The image processing system according to claim 1, wherein
   said structure deciding portion controls the screen parameter of the input image in total based on decision results of respective line segments.

10. An image forming system comprising:
    a maximum color identifying portion for identifying a color, disappearance to be avoided, from a plurality of coloring material colors used to reproduce a color of a line segment constituting an input image as a maximum color;
    a structure deciding portion for controlling a screen parameter in compliance with the maximum color identified by said maximum color identifying portion and a drawing direction of the line segment;
    a screen processing portion for executing a screen process by using the screen parameter controlled by said structure deciding portion; and
    an image forming portion for forming an image which is subjected to the screen process by said screen processing portion on an image forming medium;
    wherein:
    said structure deciding portion controls the screen parameter so that the screen process in the maximum color is earned out at a screen angle, that is different from the drawing direction of the line segment, in said screen processing portion.

11. The image forming system according to claim 10, wherein
    said structure deciding portion controls the screen parameter so that the screen process in the maximum color is carried out at a screen angle, that is different from the screen angle with respect to a line in other drawing directions, in said screen processing portion when the drawing direction of the line segment is a predetermined direction.

12. The image forming system according to claim 10, wherein said structure deciding portion decides whether or not the line segment is thinner than a predetermined width upon controlling the screen parameter.

13. The image forming system according to claim 10, wherein
said structure deciding portion decides whether or not a density of the line segment is thinner than a predetermined density upon controlling the screen parameter.

14. The image forming system according to claim 10, wherein
said maximum color identifying portion uses preferentially other colors rather than a yellow upon identifying the maximum color.

15. The image forming system according to claim 10, wherein
said screen processing portion is constructed so that the screen process at a plurality of screen angles in same resolutions and line numbers is capable to be selected by controlling the screen parameter.

16. The image forming system according to claim 10, wherein
said screen processing portion is constructed so that any of screen angles having mutual mirror image relationships is capable to be selected by controlling the screen parameter.

17. The image forming system according to claim 10, wherein
said structure deciding portion controls the screen parameter every line segment.

18. The image forming system according to claim 10, wherein
said structure deciding portion controls the screen parameter of the input image in total based on decision results of respective line segments.

19. A computer-readable recording medium for storing a program that causes a computer to execute the steps of:
a maximum color identifying step of identifying a color, disappearance to be avoided, from a plurality of coloring material colors used to reproduce a color of a line segment constituting an input image as a maximum color,
a structure deciding step of controlling a screen parameter so that a screen process in the maximum color is executed at a screen angle, and
a screen processing step of executing the screen process by using the controlled screen parameter;
wherein:
the structure deciding step controls a screen parameter so that a screen process in the maximum color is executed at a screen angle, that is different from a drawing direction of the line segment, in compliance with the maximum color and the drawing direction of the line segment.

20. The computer-readable recording medium according to claim 19, wherein
the structure deciding step controls a screen parameter so that a screen process in the maximum color is executed at a screen angle, that is different from the screen angle of the line segment, when a drawing direction of the line segment is a predetermined direction.

21. The recording medium according to claim 19, wherein
in the structure deciding step,
it is decided whether or not the line segment is thinner than a predetermined width, and
decision results are utilized when the screen parameter is controlled.

22. The recording medium according to claim 19, wherein
in the structure deciding step,
it is decided whether or not a density of the line segment is thinner than a predetermined density, and
decision results are utilized when the screen parameter is controlled.

23. The recording medium according to claim 19, wherein
other colors are used preferentially rather than a yellow in the maximum color identifying step when the maximum color is identified.

24. The recording medium according to claim 19, wherein
the screen process at a plurality of screen angles in same resolutions and line numbers is selected by controlling the screen parameter in the screen processing step.

25. The recording medium according to claim 19, wherein
the screen process is executed by controlling the screen parameter in the screen processing step to select any of screen angles having mutual mirror image relationships.

26. The recording medium according to claim 19, wherein
the screen parameter is controlled every line segment in the structure deciding step.

27. The recording medium according to claim 19, wherein
the screen parameter of the input image is controlled in total based on decision results of respective line segments in the structure deciding step.

* * * * *